United States Patent [19]

Tatematsu et al.

[11] Patent Number: 4,694,735

[45] Date of Patent: Sep. 22, 1987

[54] PISTON FOR INTERNAL COMBUSTION ENGINE

[75] Inventors: Yoshiaki Tatematsu; Atsuo Tanaka, both of Toyota, Japan

[73] Assignee: Toyota Jidosha Kabushiki Kaisha, Japan

[21] Appl. No.: 774,432

[22] Filed: Sep. 10, 1985

[30] Foreign Application Priority Data

Oct. 22, 1984 [JP] Japan ............................... 59-220443

[51] Int. Cl.[4] ............................................... F16J 1/04

[52] U.S. Cl. ........................................ 92/208; 92/209; 123/193 P

[58] Field of Search ............... 92/208, 209; 123/193 P

[56] References Cited

U.S. PATENT DOCUMENTS

| | | | |
|---|---|---|---|
| 4,245,611 | 1/1981 | Mitchell et al. | 123/193 P |
| 4,466,399 | 8/1984 | Hinz et al. | 123/193 P |
| 4,530,341 | 7/1985 | Palm | 123/193 P |

FOREIGN PATENT DOCUMENTS

| | | | |
|---|---|---|---|
| 48304 | 4/1983 | European Pat. Off. | 123/193 P |
| 56-85048 | 12/1981 | Japan . | |
| 56-85049 | 12/1981 | Japan . | |
| 2445 | 1/1982 | Japan | 123/193 P |
| 58-191350 | 12/1983 | Japan . | |
| 82552 | 5/1984 | Japan | 123/193 P |

*Primary Examiner*—James C. Yeung
*Attorney, Agent, or Firm*—Parkhurst & Oliff

[57] ABSTRACT

A piston for internal-combustion engines, reinforced at least at either the shoulder of the skirt or the piston boss thereof by a composite reinforcement consisting of a layer of inorganic long filaments and a layer or layers of inorganic staple short fibers or whiskers. The inorganic filaments are one or a combination of any of carbon, graphite, alumina, silicon carbide and glass, while the inorganic staple fiber or whiskers are silicon nitride whiskers, mineral fibers, potassium titanate whiskers, carbon fibers or graphite fibers, or a combination of those whiskers and/or fibers.

6 Claims, 13 Drawing Figures

PISTON FOR INTERNAL COMBUSTION ENGINE

BACKGROUND OF THE INVENTION

1. Field of the Invention

The present invention relates to a piston, for an internal-combustion engine, provided with a composite fiber reinforcement.

2. Description of the Related Art

In an internal-combustion engine, there has been a problem in that seizure of the piston is attributable to an excessive decrease in the clearance between the piston and the cylinder wall, resulting from thermal expansion of the piston at a high operation temperature. Although a large basic clearance between the piston and the cylinder wall serves to obviate the seizure of the piston, this gives rise to another problem, i.e., an enhancement of the noise of the internal-combustion engine during the initial period of operation after starting. To solve these problems, a strut made of a steel plate, which has a smaller thermal expansion than aluminum alloy, may be incorporated integrally into a piston when casting the same, to suppress thermal expansion of the cast piston. However, since the specific gravity of steel is greater than that of aluminum alloy, the steel strut increases the weight of the piston, which adversely affects any improvement of the performance of the internal-combustion engine. Furthermore, an internal-combustion engine having a higher performance has a tendency to operate at a higher piston temperature and, therefore, in such a high-performance engine, even a steel strut is unable to satisfactorily suppress the thermal expansion of the piston.

To solve the problems resulting from the decrease in the clearance between the piston and the cylinder wall, several techniques have been proposed. For example, the employment of a spacer expander to piston rings (Japanese Unexamined Utility Model Publication (Kokai) Nos. 56-85048 and 56-85049), and dividing a piston into a head section and a skirt section and fitting an insert in the skirt section (Japanese Utility Model Publication (Kokai) No. 58-191350) have been proposed.

SUMMARY OF THE INVENTION

It is an object of the present invention to provide a lightweight piston, for an internal-combustion engine, capable of reducing the variation of the clearance between the piston and the cylinder wall resulting from thermal expansion of the piston.

According to the present invention, there is provided a piston for an internal-combustion engine, comprising a piston body made of aluminum or an aluminum alloy, including a piston head portion, a piston skirt portion, and a piston boss portion, provided with a composite fiber reinforcement consisting of a first layer of an inorganic long filament or filaments, and a second layer or layers of inorganic staple short fibers substantially enclosing the first layer; the composite fiber reinforcement being arranged within the piston body, at least in either the piston boss or a shoulder portion of the piston skirt.

The inorganic long filament consists of filaments of one or a combination of any of carbon, graphite, alumina, silicon carbide, alumina-silica, and glass, and the coefficient of thermal linear expansion in the axial direction of the filament is preferably $12\times10^{-6}$° C. or below. The inorganic staple short fibers consist of alumina-silica fibers, alumina fibers, silicon carbide whiskers, silicon nitride whiskers, mineral fibers, potassium titanate whiskers, carbon fibers or graphite fibers, or a combination of several of those whiskers and/or fibers. The coefficient of thermal linear expansion of the inorganic staple short fibers is at least less than the coefficient of thermal linear expansion of the aluminum or aluminum alloy.

The layer of inorganic staple short fibers of the composite fiber reinforcement, enclosing the layer of inorganic long filaments has the following advantages:

(1) Since the coefficient of thermal expansion of the layer of inorganic staple short fibers is a value between the coefficient of thermal expansion of aluminum or an aluminum alloy constituting the piston body and that of the layer of inorganic long filaments, the layer of inorganic staple short fibers mitigates the stress in the piston caused by the difference in thermal expansion between the aluminum or aluminum alloy and the layer of inorganic long filaments and, in particular, effectively prevents cracks liable to be caused by quenching during the heat treatment;

(2) The layer of inorganic staple short fibers compensates for the strength of the fiber reinforced metal (FRM) including a long filament, such as a carbon filament reinforced aluminum alloy, in a direction perpendicular to the longitudinal axis of the filament;

(3) The molded layer of inorganic staple short fibers effectively prevents the deformation of the layer of inorganic long filaments in the piston casting process, and thereby a piston uniformly reinforced by a FRM strut is provided.

Thus, according to the present invention, variation of the clearance, attributable to thermal expansion, between the piston and the cylinder wall can be reduced and a lightweight piston can be provided.

DESCRIPTION OF THE PREFERRED EMBODIMENTS

Preferred embodiments of the present invention will be described hereinafter in conjunction with the accompanying drawings, in which 1 is a layer of inorganic long filament or filaments and 2 is a layer of inorganic staple short fibers. A piston for an internal-combustion engine is indicated generally by 10, and 11 is a piston pin bore (which is mechanically bored after casting), 12 is a piston boss, and 13 is a shoulder of the skirt of a piston.

First Embodiment

Figure 1:
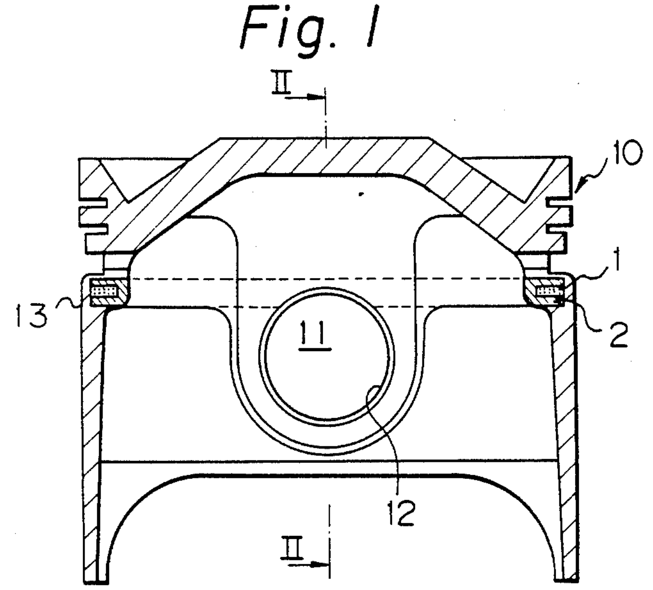
FIG. 1 is a cross-sectional view of a piston of a first embodiment according to the present invention.
Figure 2:
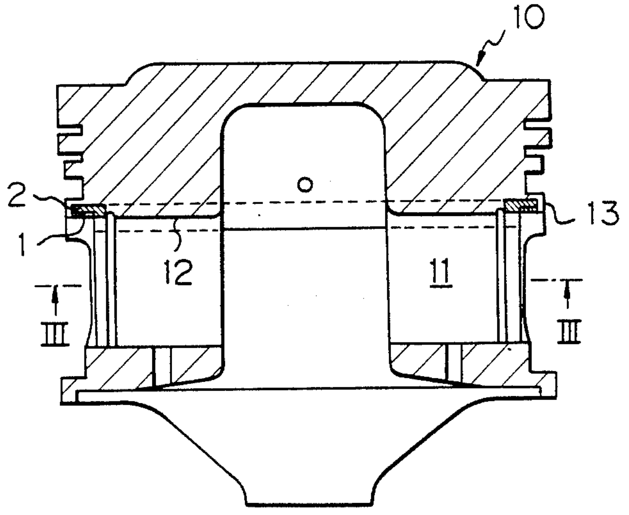
FIG. 2 is a cross-sectional view taken along line II—II in FIG. 1.
Figure 3:
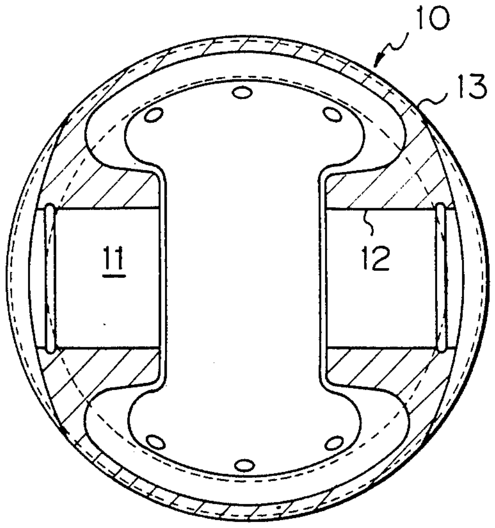
FIG. 3 is a cross-sectional view taken along line III—III in FIG. 2.

FIGS. 1 to 3 are cross-sectional views of a piston of a first embodiment according to the present invention. The piston 10 is formed by an alumina alloy. The shoulder 13 of the skirt of the piston is reinforced by an annular reinforcement consisting of a layer 1 of carbon long filaments and a layer 2 of alumina-silica staple short fibers. The piston 10 was manufactured by the following process.

Figure 4:
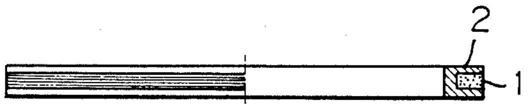
FIG. 4 is a partial cross-sectional view of a composite fiber reinforcement employed in the first embodiment.

First, the layer 2 of alumina-silica staple short fibers was formed. Namely, in this embodiment, an annular molding 2 of alumina-silica staple short fibers (outside diameter: 81 mm, inside diameter: 68 mm, thickness: 5 mm, bulk density: 0.2 g/cm$^3$, average fiber diameter: 2.8 $\mu$m, average fiber length: several mm, Manufacturer: Isolite Kogyo K.K., Trademark: "CAOWOOL"), in which the short fibers were randomly oriented, was made by vacuum-molding and machining. Then, a carbon long filament (coefficient of thermal expansion: $-1.2\times10^{-6}$/° C., average filament diameter: 6.5 $\mu$m, Manufacturer: Toray Industries Inc., Trademark: "TORECA M40") was wound, by a filament winding machine, in one direction around the above-mentioned annular layer 2 to form the layer 1, as seen in FIG. 4. The end of the winding of the carbon long filament was fixed by an inorganic adhesive, such as an alumina-silica adhesive. The bulk density of the layer 1 of the winding of carbon long filament was 0.9 g/cm$^3$. The annular composite member thus made was heated at approximately 750° C., and then placed at a predetermined position in a lower mold die of a high-pressure casting machine. A molten aluminum alloy (Japanese Industrial Standards: AC8A) of 730° C. was then poured into the lower mold die and solidified under a pressure of approximately 1000 kg/cm$^2$. The work thus formed was subjected to $T_6$ thermal treatment (JIS), and then machined to obtain a piston having an 84 mm ouside diameter and 75 mm height, as shown in FIGS. 1 to 3.

Figure 5:
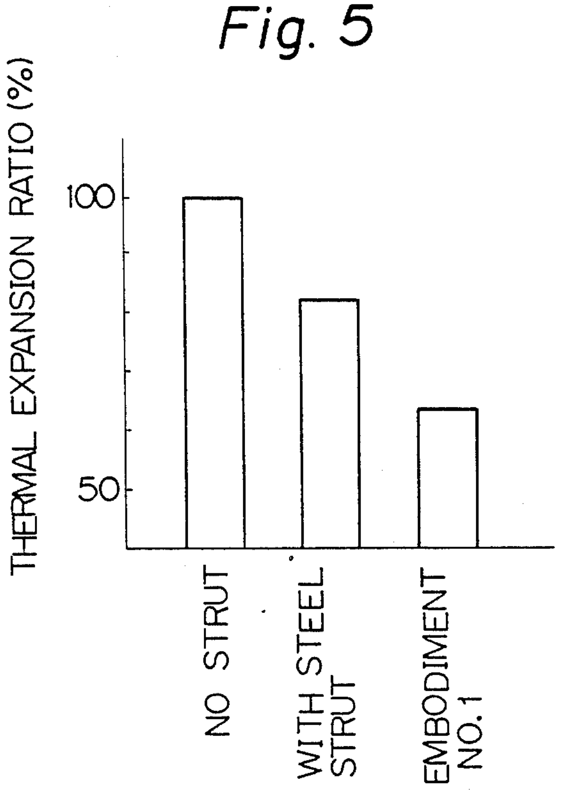
FIG. 5 is a diagram for explaining the effects (amount of thermal expansion) of the first embodiment.

The piston thus manufactured was subjected to a thermal expansion test by the following procedure. The head face of the piston was heated at 300° C. for 30 minutes by a burner, and the outside diameter of the shoulder of the skirt was then measured to find the variation of the outside diameter of the shoulder. For comparison, another piston not provided with a strut, but being the same size as the piston of the first embodiment, and still another piston with an annular strut made of steel (SPCC), were also subjected to the same thermal expansion tests. FIG. 5 shows the results of the thermal expansion tests in terms of ratio of thermal expansion. Here, the term "ratio of thermal expansion" means, in terms of percentage, the ratio of the amount of thermal expansion of a piston to that ("100") of the piston not provided with a strut. As apparent from FIG. 5, diametrical thermal expansion of the shoulder of the skirt of the first embodiment is effectively suppressed by the carbon long filament. The weight of the first embodiment is 15 g less than the weight (360 g) of the piston with the steel strut. In addition, pistons according to the first embodiment were fitted to a six-cylinder four-cycle gasoline engine (total displacement: 2812 cm$^3$, maximum output: 180 PS at 5600 rpm, maximum torque: 24.4 kg·m at 4400 rpm), and the engine was operated at 5600 rpm for 300 hours under a full-load condition. As a result, it was confirmed that the reduced diametrical thermal expansion of the pistons serves to reduce the noise of the engine, and malfunctions, such as seizure of the piston, did not occur. The accelerating performance and the output capacity of the engine were both improved due to the lightweight pistons.

Second Embodiment

Figure 6:
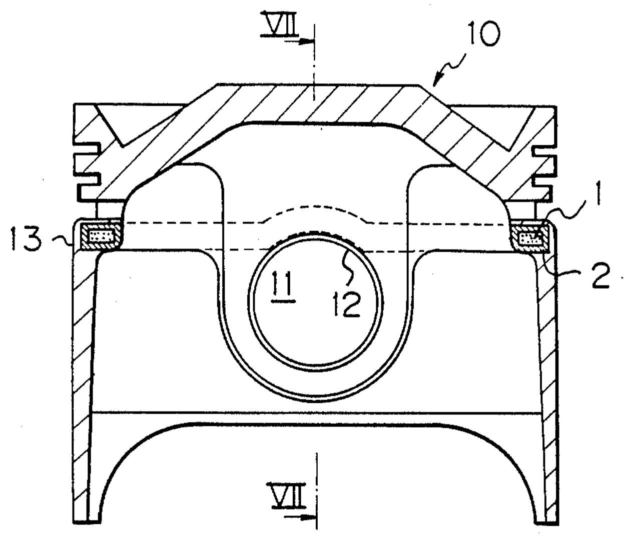
FIG. 6 is a cross-sectional view of a piston of a second embodiment according to the present invention.
Figure 7:
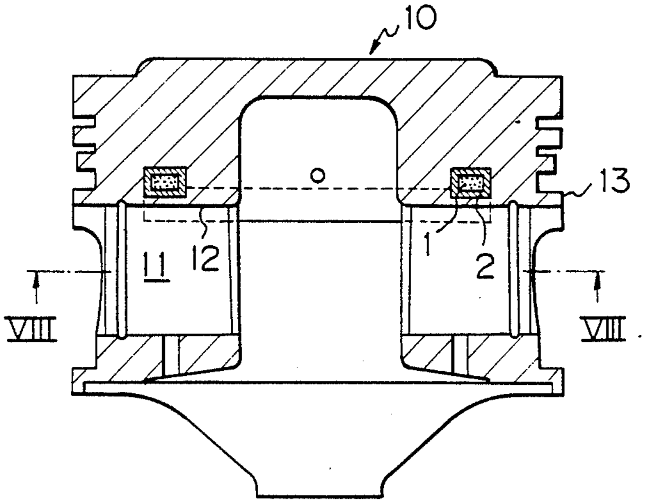
FIG. 7 is a cross-sectional view taken along line VII—VII in FIG. 6.
Figure 8:
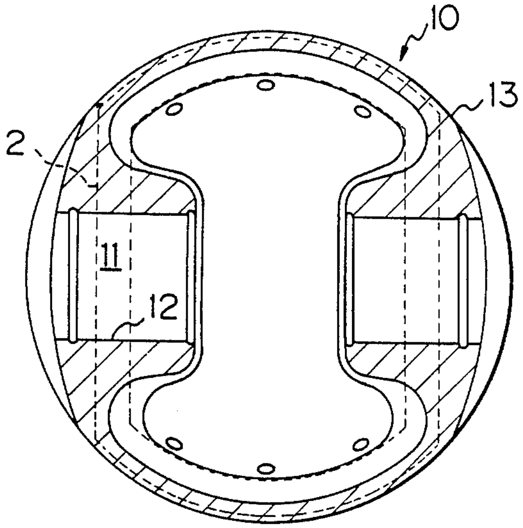
FIG. 8 is a cross-sectional view taken along line VIII—VIII in FIG. 7.

FIGS. 6 and 8 are cross-sectional views of a piston of a second embodiment according to the present invention. A piston 10 shown in FIGS. 6 to 8 is formed by an aluminum alloy. The shoulder 13 of the skirt thereof is reinforced by a composite fiber reinforcement consisting of a layer 2 of silicon carbide whiskers (short fibers) and a layer 1 of silicon carbide long filament (average filament diameter: 13 $\mu$m, coefficient of thermal expansion: $3.1\times10^{-6}$/° C., Manufacturer: Nippon Carbon Inc., Trademark: "Nicalon"), which extends along the shoulder as well as perpendicular to the center axis of the piston pin bore 11 of the piston 10. The piston 10 was manufactured by the following process.

Figure 9:
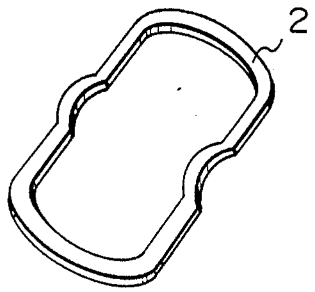
FIG. 9 is a perspective view of a composite fiber reinforcement employed in the second embodiment.

A mixture of silicon carbide whiskers (average fiber diameter: 0.5 $\mu$, average fiber length 130$\mu$) and an aqueous solution of colloidal silica of 10% by weight concentration was molded in a compression molding die for molding a strut. Then, a circular winding of a silicon carbide filament was placed in the same compression molding die, and the same mixture consisting of a silicon carbide whisker and the solution was again poured into this compression molding die to form a composite fiber strut. The strut was removed from this compression molding die after drying. Thus, a strut as shown in FIG. 9 consisting of a layer of a silicon carbide long filament 1 and a layer of silicon carbide whiskers (short fibers) 2 enclosing the former therein was obtained. The size of the strut thus obtained was 81 mm×60 mm×5 mm. After being heated at 750° C., the strut was placed at a predetermined position in a lower mold die of a high-pressure casting machine. A molten aluminum alloy (JIS AC8A) of 730° C. was then poured into the lower mold die and solidified under a pressure of 1000 kg/cm$^2$. The work thus cast was subjected to $T_6$ thermal treatment (JIS), and then machine-finished to produce a piston having an 84 mm outside diameter and 75 mm height, as shown in FIGS. 6 to 8.

The fiber volume ratios of the layer of silicon carbide whiskers (short fibers) and the layer of silicon carbide long filament with respect to the volume of the fiber composite strut, as incorporated into the piston, were 20% and 55%, respectively. The weight of this piston was 13 g less than the weight (360 g) of an equivalent piston with a steel strut. The pistons of the second embodiment were subjected to a durability test on the same engine as that employed in the thermal expansion test of the first embodiment. Similar results to those of the test of the first embodiment were obtained. That is to say, it was confirmed that the reduced thermal expansion of the pistons of the second embodiment also serve to reduce the noise of the engine and malfunctions, such as seizure of the piston, did not occur. The accelerating performance and the output capacity of the engine were both improved due to the lightweight piston.

Third Embodiment

Figure 10:
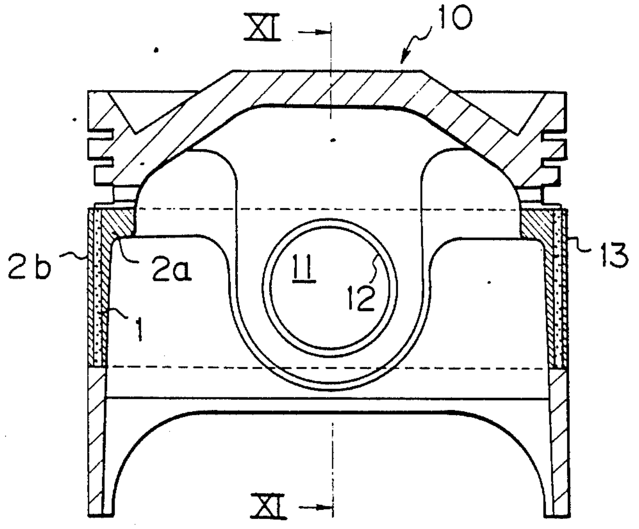
FIG. 10 is a cross-sectional view of a piston of a third embodiment according to the present invention.
Figure 11:
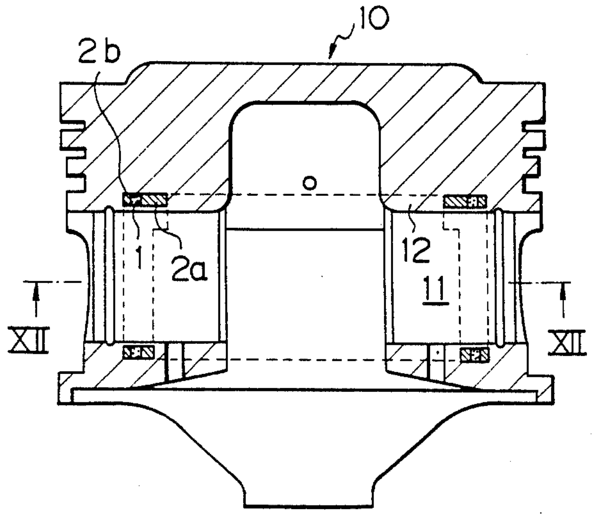
FIG. 11 is a cross-sectional view taken along line XI—XI in FIG. 10.
Figure 12:
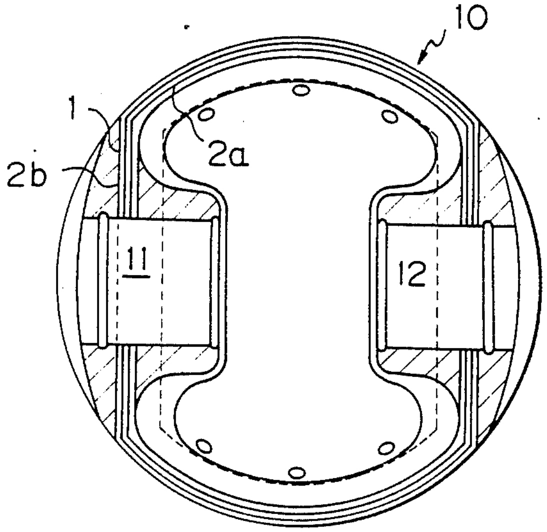
FIG. 12 is a cross-sectional view taken along line XII—XII in FIG. 11.

FIGS. 10 to 12 are cross-sectional views of a piston of a third embodiment according to the present invention. A piston 10 is formed by an aluminum alloy. The piston skirt therefore including the shoulder 13 and the piston boss 12 of the piston 10 of FIGS. 10 to 12 is reinforced by a composite fiber reinforcement consisting of inner and outer layers *2a* and *2b* of alumina staple short fibers and an intermediate layer 1 of a carbon long filament (having the same particulars as that in the first embodiment). The composite fiber reinforcement is placed across the center axis of the piston pin bore 11. This piston was manufactured by the following process.

Figure 13:
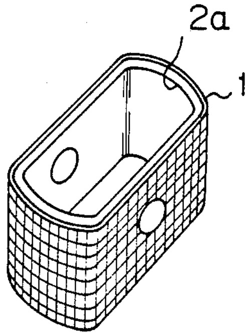
FIG. 13 is a perspective view of a composite fiber reinforcement employed in the third embodiment.

First, alumina short fibers (average fiber diameter: 3.0 μm, average fiber length: several mm, Manufacturer: International Chemical Incorporation, Trademark: "SAFILL") were molded by vacuum-molding and machined to form an inner layer *2a* of annular fiber mold (bulk density thereof: 0.15 g/cm$^3$). The inner layer *2a* was then wrapped by an intermediate layer 1 consisting of a net of carbon long filaments (FIG. 13). Then, the combination of the inner layer *2a* and the intermediate layer 1 was fitted into the outer layer 26, which had been made of the same material and in the same manner as the inner layer *2a*. The rest of the processes are the same as those for manufacturing the pistons of the first and second embodiments.

The pistons of the third embodiment were subjected to a durability test on the same engine as that employed in testing the pistons of the first and second embodiments. The performance of the pistons of the third embodiments was similar to those of the pistons of the first and second embodiments. In addition, in the third embodiment, since reinforcement of the composite fibers extends to an area of the piston skirt below the shoulder 13, interference between the piston skirt and the cylinder wall was more effectively reduced, as compared with the first and second embodiments.

We claim:

1. A piston for an internal-combustion engine, comprising a piston body made of aluminum or aluminum alloy, including a piston head portion, a piston skirt portion and a piston boss portion, provided with a composite fiber reinforcement consisting of a first layer of inorganic long filament, and a second layer or layers of inorganic staple short fibers substantially enclosing said first layer, said composite fiber reinforcement being arranged within the piston body, at least in either said piston boss or a shoulder portion of the piston skirt.

2. A piston for an internal-combustion engine according to claim 1, wherein the inorganic long filament consists essentially of at least one member selected from the group consisting of carbon, graphite, alumina, silicon carbide, alumina-silica, glass, and combinations thereof.

3. A piston for an internal-combustion engine according to claim 2, wherein a coefficient of thermal linear expansion in the axial direction of the long filament is no greater than $12\times10^{-6}/°$ C.

4. A piston for an internal-combustion engine according to claim 1, wherein the inorganic staple short fibers consist essentially of at least one member selected from the group consisting of alumina-silica fibers, alumina fibers, silicon carbide whiskers, silicon nitride whiskers, mineral fibers, potassium titanate whiskers, carbon fibers, graphite fibers, and combinations thereof.

5. A piston for an internal-combustion engine according to claim 1, wherein said composite fiber reinforcement is ring-shaped so that it is integrally molded within the piston body in the circumferential direction along said shoulder portion of the piston skirt.

6. A piston for an internal-combustion engine according to claim 1, wherein a coefficient of thermal expansion of said inorganic staple short fibers is less than a coefficient of thermal expansion of said aluminum or aluminum alloy.

* * * * *